United States Patent
Noto

(10) Patent No.: US 7,903,158 B2
(45) Date of Patent: Mar. 8, 2011

(54) IMAGE CAPTURING APPARATUS WITH ADHESION SUPPRESSING CAPABILITIES

(75) Inventor: Goro Noto, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 11/558,140

(22) Filed: Nov. 9, 2006

(65) Prior Publication Data

US 2007/0103580 A1    May 10, 2007

(30) Foreign Application Priority Data

Nov. 10, 2005   (JP) .................. 2005-326592

(51) Int. Cl.
*H04N 3/14*   (2006.01)
*H04N 5/335*  (2006.01)
*G02B 13/16*  (2006.01)
*H04N 5/225*  (2006.01)
*G01N 1/00*   (2006.01)
*G01N 33/28*  (2006.01)
*G01N 21/00*  (2006.01)
*B05D 5/06*   (2006.01)
*B05D 1/36*   (2006.01)
*B05D 7/00*   (2006.01)
*B05D 1/04*   (2006.01)

(52) U.S. Cl. ........... 348/294; 348/335; 356/38; 356/439; 427/162; 427/402; 427/474

(58) Field of Classification Search ........... 356/38, 356/239.7, 239.8, 335–340; 396/439
See application file for complete search history.

(56) References Cited

U.S. PATENT DOCUMENTS

| | | | | |
|---|---|---|---|---|
| 5,865,865 A | * | 2/1999 | Yoshida et al. | 65/60.2 |
| 6,238,799 B1 | * | 5/2001 | Opolski | 428/423.1 |
| 6,649,266 B1 | * | 11/2003 | Gross et al. | 428/410 |
| 6,800,354 B2 | * | 10/2004 | Baumann et al. | 428/141 |
| 7,527,832 B2 | * | 5/2009 | Sakoske et al. | 427/450 |
| 2002/0150725 A1 | * | 10/2002 | Nun et al. | 428/143 |
| 2002/0164443 A1 | * | 11/2002 | Oles et al. | 428/35.7 |
| 2002/0180880 A1 | * | 12/2002 | Bean et al. | 348/335 |
| 2002/0192472 A1 | * | 12/2002 | Metz et al. | 428/426 |
| 2002/0193885 A1 | * | 12/2002 | Legeay et al. | 623/23.72 |

(Continued)

FOREIGN PATENT DOCUMENTS

JP    1-197610    *  7/1998

(Continued)

OTHER PUBLICATIONS

Jacob N. Israelachvili, Chapter 12 "Electrostatic Forces Between Surfaces in Liquids", Intermolecular and Surface Forces, 1985, p. 172, Academic Press Inc., Ltd. (London).

(Continued)

*Primary Examiner* — Sinh Tran
*Assistant Examiner* — Christopher K Peterson
(74) *Attorney, Agent, or Firm* — Canon U.S.A., Inc., IP Division

(57) ABSTRACT

This invention can suppress adhesion of dust to the surface of an optical filter and the cover glass surface of a solid-state image sensor without any optically adverse effect. An image capturing apparatus includes an image capturing device which converts the optical image of an object into an electrical signal, and an optical element (11) arranged in front of the image capturing device. Minute particles of a single layer (11a) are arrayed on a surface of the optical element on the object side.

4 Claims, 11 Drawing Sheets

U.S. PATENT DOCUMENTS

| | | | |
|---|---|---|---|
| 2004/0213904 A1* | 10/2004 | Muller et al. | 427/180 |
| 2004/0233526 A1* | 11/2004 | Kaminsky et al. | 359/452 |
| 2004/0239784 A1* | 12/2004 | Ibe | 348/272 |
| 2006/0044458 A1* | 3/2006 | Kato et al. | 348/360 |
| 2006/0110542 A1* | 5/2006 | Dietz et al. | 427/384 |
| 2006/0275595 A1* | 12/2006 | Thies et al. | 428/312.2 |
| 2006/0286305 A1* | 12/2006 | Thies et al. | 427/508 |
| 2009/0011204 A1* | 1/2009 | Wang et al. | 428/215 |

FOREIGN PATENT DOCUMENTS

| | | |
|---|---|---|
| JP | 2000-029132 | 1/2000 |
| JP | 2000-126704 A | 5/2000 |
| JP | 3178009 | 4/2001 |
| JP | 2001-183289 | 7/2001 |
| JP | 2003-005254 | 1/2003 |
| JP | 2005-024905 A | 1/2005 |
| JP | 2005-148379 A | 6/2005 |

OTHER PUBLICATIONS

Fukunishi et al., Adhension Forces of Plates with Periodic Nanostructure, Proceedings of the 2004 Autumn Annual Meeting of the Society of Powder Technology, Japan, 2004, p. 34-35.

* cited by examiner

F I G. 5
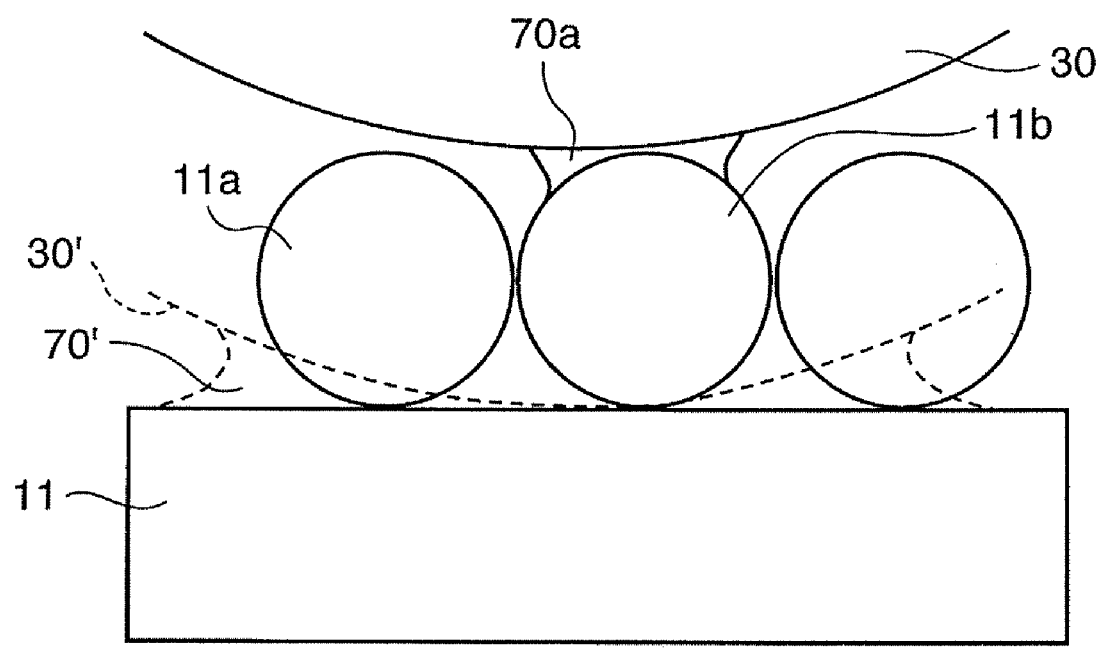

F I G. 6B

| | AVERAGE ADHESIVE FORCE (nN) | RATIO OF ADHESIVE FORCE |
|---|---|---|
| PARTICLE DIAMETER : 90 nm | 40.3 | 82.1% |
| PARTICLE DIAMETER : 170 nm | 40.0 | 81.6% |
| NO SINGLE MINUTE-PARTICLE LAYER | 49.0 | |

IMAGE CAPTURING APPARATUS WITH ADHESION SUPPRESSING CAPABILITIES

BACKGROUND OF THE INVENTION

1. Field of the Invention

The present invention relates to a technique of suppressing adhesion of dust to the surface of an optical member (e.g., a solid-state image sensor, optical filter, or lens) which is mounted in an optical device (e.g., a digital camera) and arranged on or near the focal plane.

2. Description of the Related Art

Conventionally, if an alien substance such as dust adheres near the focal plane of the photographing lens of a lens interchangeable type single-lens reflex camera, the solid-state image sensor captures the shadow of the alien substance. The cause of the alien substance is considered to be dust entering from the outside in lens exchange, or fine powder generated from the wear of components (e.g., a resin serving as a structure material) generated along with the operation of the shutter or mirror inside the camera. The alien substance generated due to this cause sometimes enters between a cover glass for protecting especially the solid-state image sensor, and an optical filter (e.g., an infrared-cut filter or optical low-pass filter (to be abbreviated as an LPF hereinafter)) arranged in front of the cover glass. In this case, the camera must be disassembled to remove the alien substance. A closed structure is very effective in preventing an alien substance from entering between the cover glass of the solid-state image sensor and the optical filter.

If an alien substance adheres to a surface of the optical filter opposite to a surface facing the solid-state image sensor and the adhesion position is near the focal plane, the solid-state image sensor undesirably captures the shadow of the alien substance.

To solve this problem, there is known a structure of cleaning the cover glass surface of a solid-state image sensor with a wiper (Japanese Patent Laid-Open No. 2003-005254). This camera structure allows removing an alien substance adhered to the cover glass surface of the solid-state image sensor or the top surface (e.g., optical filter surface) of the dustproof structure without dismounting the lens or disassembling the camera. In the structure in Japanese Patent Laid-Open No. 2003-005254, the wiper wipes the cover glass surface of the solid-state image sensor or the top surface of the dustproof structure. When a solid alien substance such as metal powder adheres, it may scratch the cover glass surface of the solid-state image sensor or the top surface of the dustproof structure. The alien substance removed by the wiper floats in the camera, and the temporarily removed alien substance adheres again to the cover glass surface of the solid-state image sensor or on the top surface of the dustproof structure.

As a solution to this problem, there is known a technique of forming transparent electrodes on the cover glass surface of a solid-state image sensor and the surface of an optical filter in order to suppress adhesion of an alien substance on the cover glass surface of the solid-state image sensor (Japanese Patent Laid-Open No. 2000-029132). The technique disclosed in Japanese Patent Laid-Open No. 2000-029132 applies a potential to the transparent electrodes on the cover glass surface of the solid-state image sensor and the surface of the optical filter. The potential can neutralize static electricity generated on the cover glass surface of the solid-state image sensor and the surface of the optical filter, suppressing adhesion of dust. However, the transparent electrodes on the cover glass surface and optical filter surface decrease the light transmittance to the image sensor and generates an optically adverse effect. Static electricity generated on the cover glass surface of the solid-state image sensor and the surface of the optical filter varies depending on the ambient environment (temperature and humidity) and use conditions. It is difficult to neutralize static electricity. If neutralization of static electricity fails, adhesion of dust cannot be satisfactorily suppressed.

As another technique, there is known a technique of forming a periodic microstructure with a femtosecond laser on the surface of a flat silicon plate in order to decrease the adhesive force of minute particles in the air to the flat plate (Proceedings of the 2004 Autumn Annual Meeting of the Society of Powder Technology, Japan (FIGS. 1 and 2 on p. 34 and FIG. 4 on p. 35)). This reference reports that the periodic microstructure reduces the Van der Waals force and liquid bridge force acting between glass bead and the flat silicon plate. However, this reference does not describe whether the femtosecond laser can form a periodic microstructure on the surface of the cover glass of an optical element or that of an optical filter. Since the period of the periodic microstructure is about 620 nm within the visible light region, an optically adverse effect may occur. The technique of this report is not directly applicable as a measure against an alien substance adhered to the cover glass surface of a solid-state image sensor and the surface of an optical filter.

A microstructure is also formable on the substrate surface by arraying minute particles on the substrate surface. There is an arrangement in which the microstructure of minute particles functions as an antireflection film (Japanese Patent No. 3178009). The antireflection effect is achieved by forming a multilayered minute-particle thin film. Japanese Patent No. 3178009 discloses that a minute-particle film can provide an antireflection function and conduction function, but does not disclose any effect of reducing adhesive force.

The cover glass surface of a solid-state image sensor and the surface of an optical filter have dielectric multilayered films for preventing reflection and cutting infrared rays in order to obtain a desired spectral transmittance. However, forming a dielectric multilayered film on the top surface of the microstructure by vapor deposition or the like flattens the microstructure, losing the effect of suppressing adhesion of an alien substance.

SUMMARY OF THE INVENTION

The present invention has been made to overcome the conventional drawbacks, and has as its object to suppress adhesion of dust to the surface of an optical filter and the cover glass surface of a solid-state image sensor without any optically adverse effect.

In order to solve the above problems and achieve the object, according to the first aspect of the present invention, an image capturing apparatus is comprising an image capturing unit which converts an optical image of an object into an electrical signal, and an optical element arranged in front of the image capturing unit, wherein minute particles of a single layer are arrayed on a surface of the optical element on an object side.

According to the second aspect of the present invention, an image capturing apparatus is comprising an image capturing unit which converts an optical image of an object into an electrical signal, wherein minute particles of a single layer are arrayed on a surface of the image capturing unit on an object side.

Further features of the present invention will become apparent from the following description of exemplary embodiments (with reference to the attached drawings).

BRIEF DESCRIPTION OF THE DRAWINGS

FIG. 5 is an enlarged view of a portion where dust contacts a single minute-particle layer;

FIG. 6B is a table showing the measurement value of the Van der Waals force;

DESCRIPTION OF THE EMBODIMENT

A preferred embodiment of the present invention will be described in detail with reference to the accompanying drawings.

A lens interchangeable type single-lens reflex camera (to be abbreviated as a D-SLR hereinafter) according to the embodiment of the present invention will be explained with reference to FIGS. 1 to 5.

Figure 1:
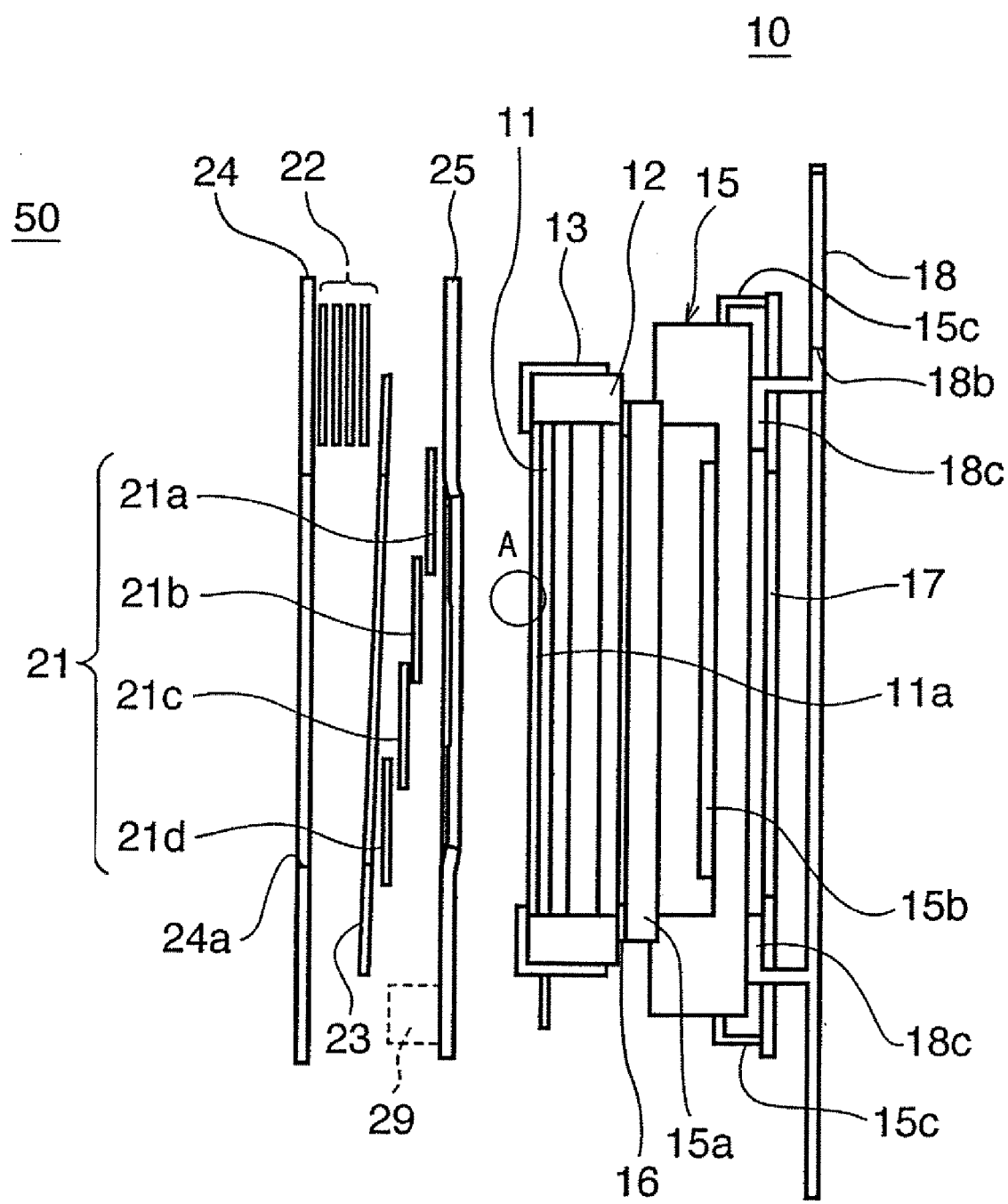
FIG. 1 is a side sectional view for explaining the schematic structures of an image capturing unit and focal plane shutter in an embodiment of the present invention.
Figure 2:
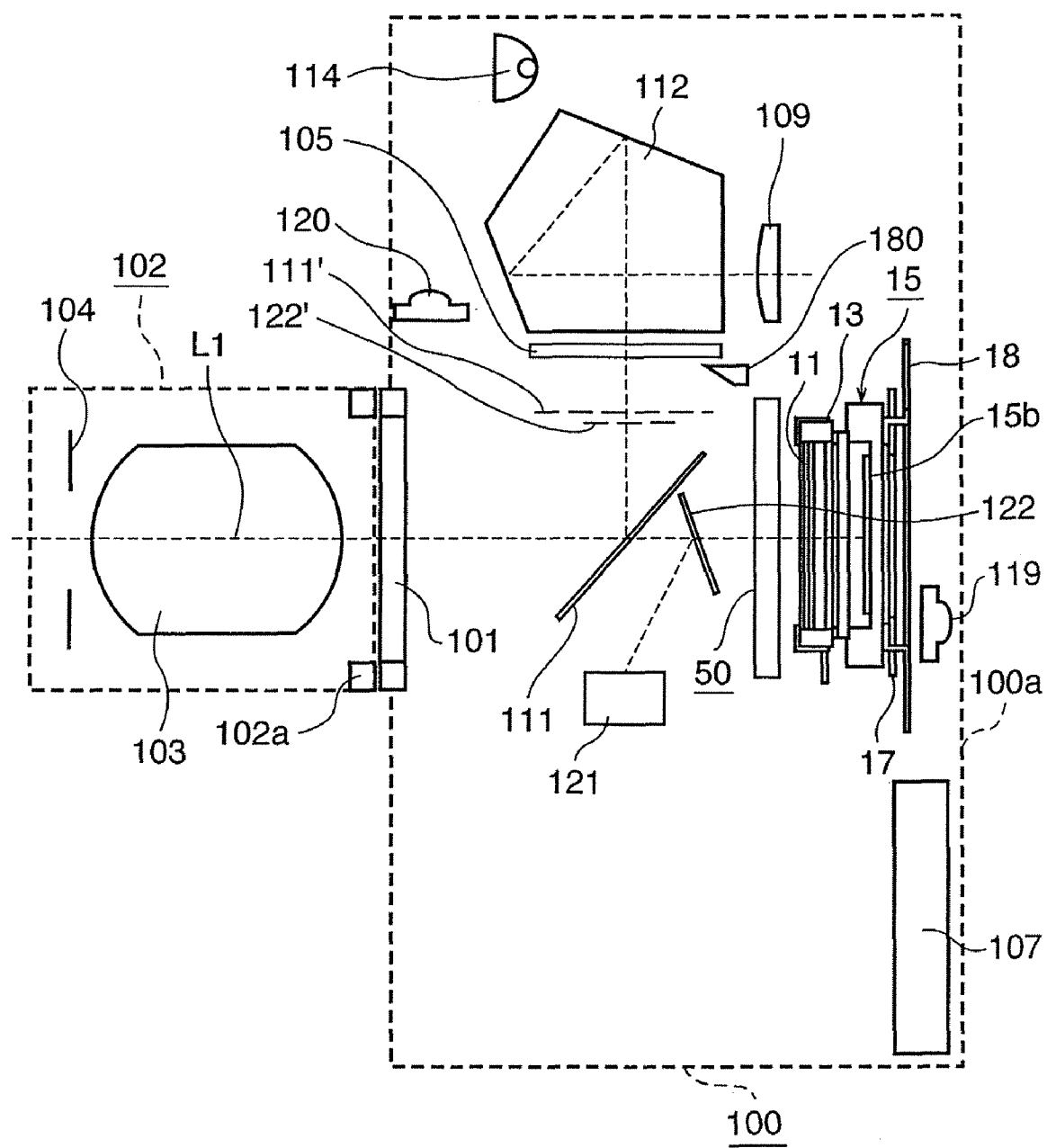
FIG. 2 is a schematic view showing the configuration of the camera system of a D-SLR in the embodiment of the present invention.
Figure 3:
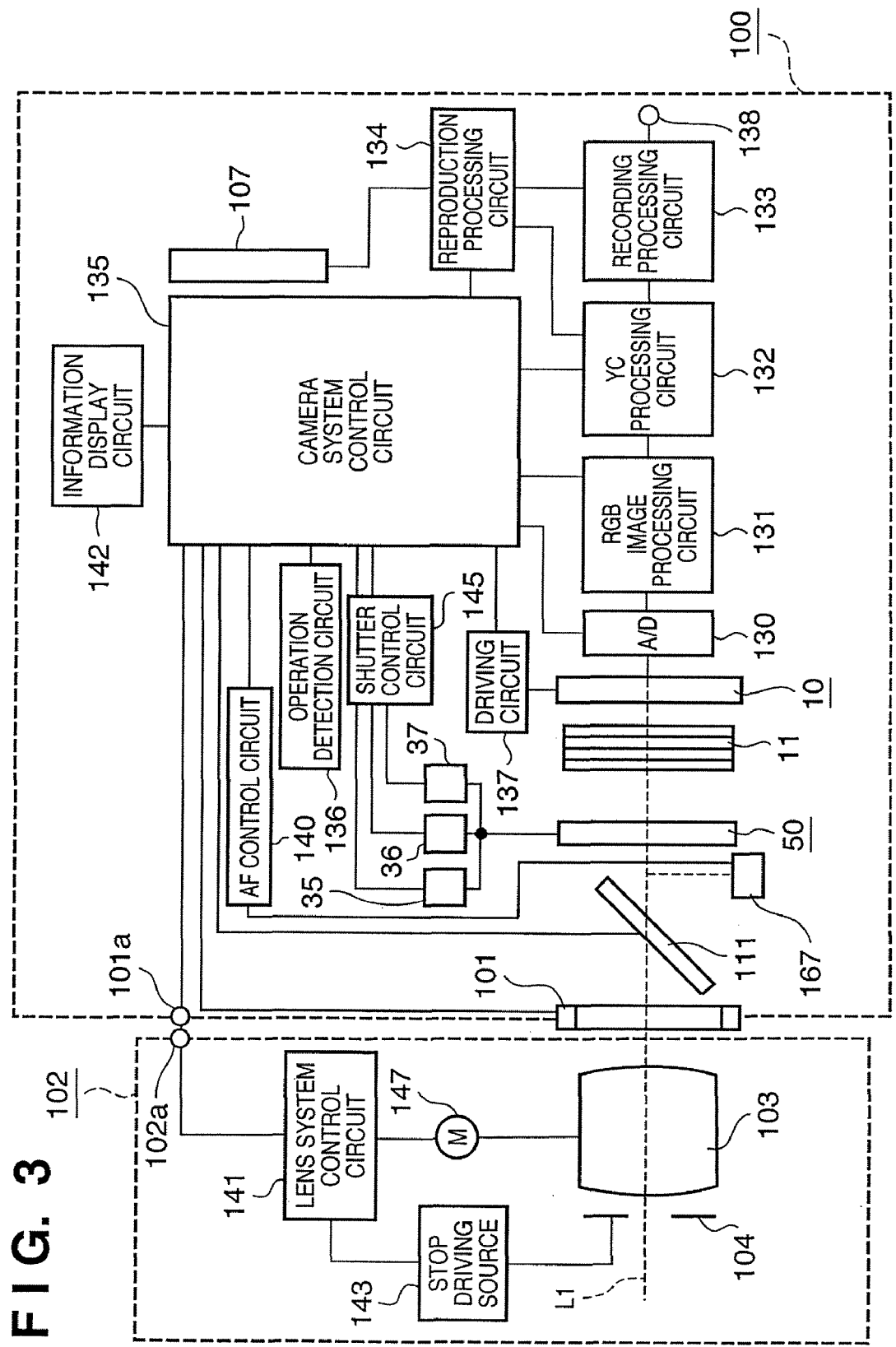
FIG. 3 is a block diagram showing the electrical configuration of the camera system of the D-SLR in the embodiment of the present invention.
Figure 4:
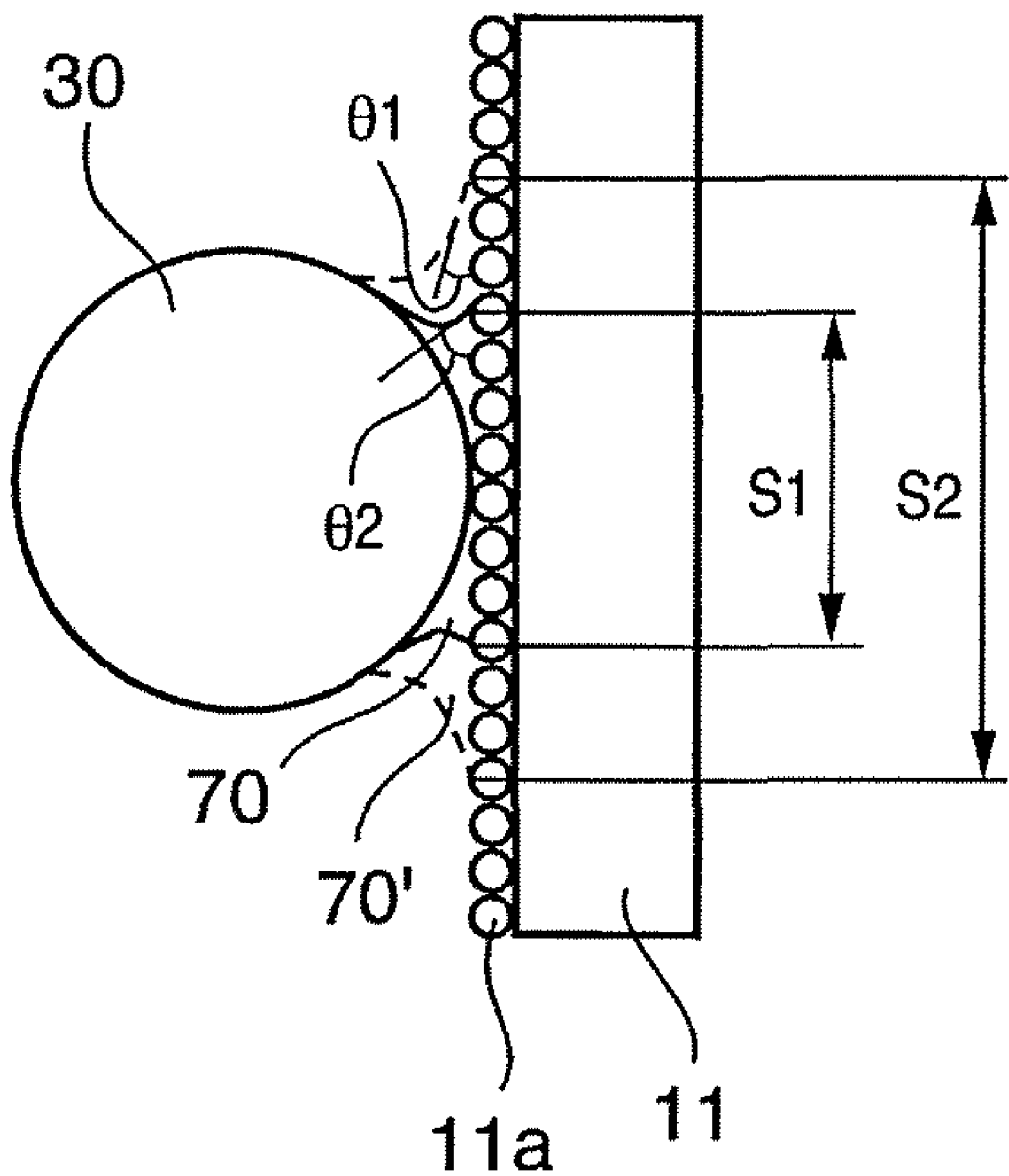
FIG. 4 is an enlarged view of part A in FIG. 1.

FIG. 1 is a side sectional view for explaining the schematic structures of an image capturing unit 10 and focal plane shutter 50 of a D-SLR 100 in the embodiment. FIG. 2 is a schematic view showing the configuration of the camera system of the D-SLR 100. FIG. 3 is a block diagram showing the electrical configuration of the camera system of the D-SLR 100 in the embodiment. FIG. 4 is a view of part A in FIG. 1 in detail. FIG. 5 is a partially enlarged view of FIG. 4.

In FIG. 1, the image capturing unit 10 comprises a solid-state image sensing device 15. The solid-state image sensing device 15 comprises an optical element 11, a holding member 12 which holds the optical element 11, a support plate 13 which abuts the surface of the optical element 11 and integrates the optical element 11 and holding member 12, and a cover member 15a for protecting a solid-state image sensor 15b. The image capturing unit 10 comprises a seal member 16 for sealing the gap between the cover member 15a of the solid-state image sensing device 15 and the optical element 11. The image capturing unit 10 further comprises a substrate 17 which connects connection terminals 15c of the solid-state image sensing device 15, and supports electrical elements forming a control circuit for controlling the operation of the D-SLR 100. The image capturing unit 10 also comprises a holding plate 18 which is integral with the solid-state image sensing device 15 to fix it to the chassis (not shown) of the D-SLR 100 with screws (not shown).

A surface of the optical element 11 opposing the focal plane shutter 50 has a single minute-particle layer 11a formed from at least one type of particle. The single minute-particle layer 11a is formed from a low-refractive-index material such as $MgF_2$ or $SiO_2$, or a particle which is made hollow to obtain a low refractive index and has a particle diameter of 200 nm. If the particle diameter increases to the visible light wave range (about 350 nm to 700 nm) or more, an optically adverse effect such as scattering may occur. The particle diameter is desirably 200 nm or less.

The single minute-particle layer 11a is arrayed on the surface of the optical element 11 by LB (Langmuir-Blodgett) or the like.

The focal plane shutter 50 comprises a front curtain 21 made up of a plurality of shutter blades 21a to 21d, and a rear curtain 22 similarly made up of a plurality of shutter blades. An intermediate plate 23 is interposed between the front 21 and rear curtains 22 to separate their driving spaces. A press plate 24 which is the press plate of the rear curtain 22 and has an aperture 24a at almost the center for the purpose of image capturing is arranged in front of the rear curtain 22. A cover plate 25 which is the press plate of the front curtain 21 and has an aperture 25a at almost the center for the purpose of image capturing is arranged behind the front curtain 21. Reference numeral 29 denotes a rubber stopper having a stopper portion which positions the shutter blades 21a to 21d of the front curtain 21 when they are open.

As shown in FIG. 2, the camera system according to the embodiment comprises a camera body (image capturing apparatus) 100a, and a lens device 102 detachably mounted on the camera body 100a.

The D-SLR 100 is a 1CCD digital color camera using an image sensor such as a CCD or CMOS sensor. The D-SLR 100 drives the image sensor continuously or once to obtain an image signal representing a moving or still image. The image sensor is an area sensor which converts exposure light into an electrical signal for each pixel, accumulates charges corresponding to the light reception amount, and reads out accumulated charges.

In FIG. 2, reference numeral 100 denotes a D-SLR; and 101, a mount mechanism which connects the detachable lens device 102 to the D-SLR 100. The lens device 102 electrically, mechanically connects to the D-SLR 100 via the mount mechanism 101. By mounting lens devices 102 of different focal lengths on the D-SLR 100, the D-SLR 100 can obtain photographing frames of various view angles.

The optical element 11 exists on an optical axis L1 extending from a photographing optical system 103 of the lens device 102 to the solid-state image sensing device 15. The optical element 11 limits the cutoff frequency of the photographing optical system 103 so as not to transmit an unnecessarily high spatial frequency component of an object image (optical image) to the solid-state image sensing device 15.

A signal read out from the solid-state image sensing device 15 undergoes a predetermined process (to be described later), and is displayed as image data on a display unit 107. The display unit 107 is attached to the rear surface of the D-SLR body (camera body) 100a. The user can directly see the display on the display unit 107.

Power consumption decreases and the flat display unit 107 is obtained by forming the display unit 107 from an organic EL spatial modulation element, liquid crystal spatial modulation element, a spatial modulation element using electrophoresis of minute particles, or the like. This structure can achieve power saving and downsizing of the D-SLR 100.

For example, the solid-state image sensing device 15 is a CMOS process compatible sensor (to be abbreviated as a CMOS sensor hereinafter) which is one of amplifier type solid-state image sensors. One feature of the CMOS sensor is to greatly reduce the number of masks and the number of process steps in comparison with those for a CCD because the MOS transistor of the area sensor and peripheral circuits (e.g., an image capturing apparatus driving circuit, A/D conversion circuit, and image processing circuit) are formable in the same step. The CMOS sensor also has a feature capable of random access to an arbitrary pixel. The CMOS sensor facilitates interleaved read for the display, and can provide real-time display on the display unit 107 at a high display rate.

By using the above-described features, the solid-state image sensing device 15 performs a display image output operation (read from a partially interleaved light-receiving region of the solid-state image sensing device 15), and a high-resolution image output operation (read from the entire light-receiving region).

Reference numeral 111 denotes a movable half-mirror which reflects part of a beam traveling from the photographing optical system 103 and transmits the remaining beam. The half-mirror 111 has a refractive index of about 1.5 and a thickness of 0.5 mm. Reference numeral 105 denotes a focusing screen arranged on a prospective imaging plane of an object image formed by the photographing optical system 103; and 112, a pentaprism.

Reference numeral 109 denotes a viewfinder lens for observing an object image formed on the focusing screen. The viewfinder lens 109 is formed from one or a plurality of viewfinder lenses (not shown). The focusing screen 105, pentaprism 112, and viewfinder lens 109 form a viewfinder optical system.

A movable submirror 122 is arranged behind (on the image plane side of) the half-mirror 111. The submirror 122 reflects a beam near the optical axis L1 out of a beam having passed through the half-mirror 111, and guides the reflected beam to a focus detection unit 121. The submirror 122 rotates about a rotating shaft attached to the holding member (not shown) of the half-mirror 111, and moves in synchronism with the motion of the half-mirror 111. The focus detection unit 121 receives a beam traveling from the submirror 122 to detect the focus by a phase difference detection method.

The optical path splitting system made up of the half-mirror ill and submirror 122 can take two optical path splitting states. One is the first optical path splitting state for guiding light to the viewfinder optical system, and the other is the second optical path splitting state (positions 111' and 122' represented by broken lines in FIG. 2) in which the optical path splitting system retreats from the photographing optical path in order to guide a beam coming from the imaging lens (not shown) directly to the solid-state image sensing device 15.

Reference numeral 114 denotes an electronic flash unit which is movable between a storage position where the D-SLR 100 stores the electronic flash unit 114, and a light-emitting position where the electronic flash unit 114 protrudes from the D-SLR 100. The focal plane shutter 50 adjusts the light quantity incident on the image plane. Reference numeral 119 denotes a main switch for activating the D-SLR 100.

Reference numeral 120 denotes a release button pressed at two stages. By half-pressing the release button 120 (turning on SW1), a photographing preparation operation (e.g., photometric operation and focusing operation) starts. By fully pressing the release button 120 (turning on SW2), a photographing operation (recording of image data read out from the solid-state image sensing device 15 onto a recording medium) starts.

Reference numeral 180 denotes an optical viewfinder intra-information display unit for displaying specific information on the focusing screen 105.

Parts related to capturing and recording of an object image will be described with reference to the block diagram of the D-SLR 100 in the embodiment shown in FIG. 3.

The camera system comprises an image capturing system, image processing system, recording/reproduction system, and control system. The image capturing system comprises the photographing optical system 103 and solid-state image sensing device 15. The image processing system comprises an A/D converter 130, RGB image processing circuit 131, and YC processing circuit 132. The recording/reproduction system comprises a recording processing circuit 133 and reproduction processing circuit 134. The control system comprises a camera system control circuit (control means) 135, operation detection circuit 136, and image capturing apparatus driving circuit 137.

Reference numeral 138 denotes a connection terminal standardized to connect an external computer or the like and transmit/receive data. The above-described electric circuits are driven by receiving power from a primary battery (e.g., alkaline cell or lithium cell) or a secondary battery (e.g., NiMH battery or lithium-ion battery) (none of them is shown).

The image capturing system is an optical processing system which forms light from an object into an image on the image sensing surface of the solid-state image sensing device 15 via the photographing optical system 103. The solid-state image sensing device 15 can receive a proper quantity of object light by controlling driving of a stop 104 arranged in the photographing optical system 103, and if necessary, driving the focal plane shutter 50 via a shutter control circuit 145.

The solid-state image sensing device 15 uses an image sensor having a total of about 10,000,000 square pixels, 3700 pixels of which are arrayed along the long side, and 2,800 pixels of which are arrayed along the short side. R (red), G (green), and B (blue) color filters are periodically arranged on respective pixels to form a so-called Bayer array in which four pixels are grouped.

The Bayer array improves total image performance by arranging G pixels much more than R and B pixels because the user strongly senses G when seeing an image. In general, an image process using an image sensor of this type generates a luminance signal mainly from a G signal, and a color signal from R, G, and B signals.

The image processing system receives, via the A/D converter 130, a signal read from the solid-state image sensing device 15. The image processing system generates image data by an image process.

The A/D converter 130 is a signal conversion circuit which outputs a digital signal by converting, e.g., a signal output from the solid-state image sensing device 15 into a 10-bit digital signal in accordance with the amplitude of a signal read out from each pixel of the solid-state image sensing device 15. The subsequent image process is executed by a digital process.

The image processing system is a signal processing circuit which obtains an image signal of a desired format from R, G, and B digital signals. The image processing system converts the R, G, and B color signals into YC signals represented by a luminance signal Y and color difference signals (R-Y) and (B-Y).

The RGB image processing circuit 131 is a signal processing circuit which processes a signal output from the A/D converter 130. The RGB image processing circuit 131 has a white balance circuit, a gamma correction circuit, and an interpolation operation circuit which increases the resolution by interpolation operation.

The YC processing circuit 132 is a signal processing circuit which generates the luminance signal Y and the color difference signals R-Y and B-Y. The YC processing circuit 132 has a high-frequency luminance signal generation circuit which generates a high-frequency luminance signal YH, a low-frequency luminance signal generation circuit which generates a low-frequency luminance signal YL, and a color difference signal generation circuit which generates the color difference signals R-Y and B-Y. The luminance signal Y is formed by synthesizing the high-frequency luminance signal YH and low-frequency luminance signal YL.

The recording/reproduction system is a processing system which outputs an image signal to a memory (not shown) and outputs an image signal to the display unit 107. The recording processing circuit 133 writes and reads out an image signal in and from the memory. The reproduction processing circuit 134 reproduces an image signal read out from the memory, and outputs it to the display unit 107.

The recording processing circuit 133 incorporates a compression/decompression circuit which compresses, to a predetermined compression format, a YC signal representing still image data and moving image data and decompresses compressed data. The compression/decompression circuit has a frame memory and the like for a signal process. The compression/decompression circuit accumulates YC signals of each frame from the image processing system in the frame memory, reads out accumulated signals from each of blocks, and compression-codes them. In compression coding, for example, image signals of each block are two-dimensionally orthogonally transformed, normalized, and Huffman-coded.

The reproduction processing circuit 134 matrix-transforms the luminance signal Y and the color difference signals R-Y and B-Y to convert them into, e.g., R, G, and B signals. The reproduction processing circuit 134 outputs converted signals to the display unit 107, which displays (plays back) them as a visible image. The reproduction processing circuit 134 and display unit 107 may connect to each other via wireless communication such as Bluetooth. This arrangement allows a user at a remote place to monitor an image captured by the camera.

The operation detection circuit 136 in the control system detects operations to the main switch 119, release button 120, and the like (other switches are not shown), and outputs the detection result to the camera system control circuit 135.

The camera system control circuit 135 receives a detection signal from the operation detection circuit 136, and performs an operation corresponding to the detection result. The camera system control circuit 135 generates the timing signal of an image capturing operation, and outputs it to the image capturing apparatus driving circuit 137.

The image capturing apparatus driving circuit 137 receives a control signal from the camera system control circuit 135, and generates a driving signal for driving the solid-state image sensing device 15. An information display circuit 142 receives a control signal from the camera system control circuit 135, and controls driving of the optical viewfinder intra-information display unit 180.

The control system controls driving of the image capturing system, image processing system, and recording/reproduction system in accordance with operations to various switches arranged in the D-SLR 100. For example, when the user operates the release button 120 to turn on SW2, the control system (camera system control circuit 135) controls driving of the solid-state image sensing device 15, the operation of the RGB image processing circuit 131, the compression process of the recording processing circuit 133, and the like. The control system controls driving of the optical viewfinder intra-information display unit 180 via the information display circuit 142 to change the display (display segment state) in the optical viewfinder.

The focusing operation of the photographing optical system 103 will be explained.

The camera system control circuit 135 connects to an AF control circuit 140. By mounting the lens device 102 on the D-SLR 100, the camera system control circuit 135 connects to a lens system control circuit 141 in the lens device 102 via mount contacts 101a and 102a. The AF control circuit 140, lens system control circuit 141, and camera system control circuit 135 mutually communicate data necessary for a specific process.

The focus detection unit 121 (focus detection sensor 167) outputs, to the AF control circuit 140, a detection signal in a focus detection region set at a predetermined position within the photographing frame. The AF control circuit 140 generates a focus detection signal on the basis of a signal output from the focus detection unit 121, and detects the focusing state (defocus amount) of the photographing optical system 103. The AF control circuit 140 converts the detected defocus amount into the driving amount of a focus lens which is one element of the photographing optical system 103. The AF control circuit 140 transmits information on the focus lens driving amount to the lens system control circuit 141 via the camera system control circuit 135.

When focusing on a moving object, the AF control circuit 140 predicts a proper stop position of the focus lens in consideration of a time lag till the start of actual image capturing control after fully pressing the release button 120. The AF control circuit 140 transmits, to the lens system control circuit 141, information on the focus lens driving amount to the predicted stop position.

When the camera system control circuit 135 determines, on the basis of a signal output from the solid-state image sensing device 15, that the object luminance is low and no sufficient focus detection precision is obtained, it drives the electronic flash unit 114 or a white LED or fluorescent tube (neither is shown) arranged in the D-SLR 100, illuminating the object.

When receiving information on the focus lens driving amount from the camera system control circuit 135, the lens system control circuit 141 controls driving of an AF motor 147 arranged in the lens device 102. The lens system control circuit 141 moves the focus lens toward the optical axis L1 by the driving amount via a driving mechanism (not shown), adjusting the photographing optical system 103 to an in-focus state. When the focus lens is formed from a liquid lens or the like, the lens system control circuit 141 changes the interface shape.

When receiving information on the exposure value (F-number) from the camera system control circuit 135, the lens system control circuit 141 controls driving of a stop driving actuator 143 in the lens device 102, operating the stop 104 to a stop aperture diameter corresponding to the F-number.

The shutter control circuit 145 controls a front curtain driving source 35 having a driving lever, and an electromagnetic actuator made up of a known coil, yoke, and the like. The shutter control circuit 145 controls a charge driving source 36 which performs a closing operation to close the open front curtain 21, as shown in FIG. 1, and has a driving lever, spring, and the like. The shutter control circuit 145 also controls a rear curtain driving source 37 which opens/closes the rear curtain 22 and has a driving lever, and an electromagnetic actuator made up of a known coil, yoke, and the like. When receiving information on the shutter speed from the camera system control circuit 135, the shutter control circuit 145 controls driving of the front curtain driving source 35, rear curtain driving source 37, and charge driving source 36 serving as the driving sources of the front curtain 21 and rear curtain 22 of the focal plane shutter 50, thereby operating the front curtain 21 and rear curtain 22 at the shutter speed.

The operations of the focal plane shutter 50 and stop 104 can guide a proper quantity of object light toward the image plane.

When the AF control circuit 140 detects that the D-SLR 100 focuses on an object, it transmits information to this effect to the camera system control circuit 135. If the user fully presses the release button 120 to turn on SW2, the image capturing system, image processing system, and recording/reproduction system execute a photographing operation, as described above.

The effect of the single minute-particle layer 11a formed on the surface of the optical element 11 according to the embodiment will be explained with reference to FIGS. 4 to 6B.

FIG. 4 is an enlarged view of part A in FIG. 1, and shows a state in which dust adheres to the surface of the optical element 11. In FIG. 4, reference numeral 30 denotes dust. A liquid bridge is formed between the dust 30 and the surface of the optical element 11, as will be described below. Reference numeral 70 denotes a liquid bridge (represented by a solid line in FIG. 4) formed when the single minute-particle layer 11a exists on the surface of the optical element 11, like the embodiment; and 70', a liquid bridge (represented by a broken line in FIG. 4) formed when the single minute-particle layer 11a does not exist on the surface of the optical element 11.

When the dust 30 adheres to the surface of the optical element 11, the water molecule (not shown) in air coagulates between the dust 30 and the surface of the optical element 11 to form the liquid bridge 70. The liquid bridge 70 applies the adhesive force $F_L$ as a liquid bridge force between the dust 30 and the surface of the optical element 11:

$$F_L = 2\pi\sigma D\cos\theta (N) \quad (1)$$

where σ is the surface tension (N/m) of water, D is the diameter (m) of the dust 30, and θ is the contact angle (DEG) of water to the surface of the optical element 11.

As for the liquid bridge force to the same dust 30, the surface tension (surface energy) of water is constant, and the contact angle θ changes between the presence and absence of the single minute-particle layer 11a on the surface of the optical element 11, as will be described below. The contact angle is θ1 in the absence of the single minute-particle layer 11a and θ2 in the presence of single minute-particle layer 11a (θ1<θ2: see FIG. 4).

The contact angle is the ratio of the surface energies of water and the single minute-particle layer 11a (or the surface of the optical element 11). Attention is paid to a portion where the dust 30 contacts the single minute-particle layer 11a (see FIG. 5).

As shown in FIG. 5, when the single minute-particle layer 11a exists, the dust 30 contacts at least one minute particle 11b which forms the minute-particle layer 11a, and a liquid bridge 70a is formed between the single minute particle 11b and the dust 30.

In practice, the dust 30 contacts a plurality of minute particles 11b of the single minute-particle layer 11a to form a plurality of liquid bridges 70a. A set of the liquid bridges 70a forms the liquid bridge 70 shown in FIG. 4.

The following fact is derived from a comparison between the contact area when the dust 30 contacts the single minute-particle layer 11a, and the contact area when the dust 30 contacts the surface of the optical element 11. That is, the contact area when the dust 30 contacts the single minute-particle layer 11a is smaller regardless of the relationship between the surface energy of the single minute particle 11b and the surface energy of the optical element 11 in the absence of the single minute-particle layer 11a. For this reason, the apparent contact angle changes depending on whether the single minute-particle layer 11a exists. Hence, θ1<θ2 because the contact angle when the dust 30 contacts the single minute-particle layer 11a is larger.

The following relationship is found from a comparison between the size of the liquid bridge 70 formed between the dust 30 and the surface of the single minute-particle layer 11a and that of the liquid bridge 70' formed between the dust 30 and the surface of the optical element 11. That is, the liquid bridge 70 (S1 in FIG. 4) in the presence of the single minute-particle layer 11a is smaller than the liquid bridge 70' (S2 in FIG. 4) in the absence of the single minute-particle layer 11a.

In equation (1), only the contact angle θ changes depending on whether the single minute-particle layer 11a exists, so the adhesive force $F_L$ decreases as the contact angle increases (0°≦θ≦90°). In other words, $F_{L1} < F_{L2}$ holds from a comparison between the adhesive force $F_{L1}$ in the presence of the single minute-particle layer 11a and the adhesive force $F_{L2}$ in the absence of the single minute-particle layer 11a.

The single minute-particle layer 11a weakens the adhesive force of the dust 30 to the single minute-particle layer 11a (optical element 11). Even if the dust 30 is to adhere to the optical element 11, its adhesive force is weak in the presence of the single minute-particle layer 11a. The dust 30 drops from the surface of the optical element 11 under the influence of gravity applied to the dust 30, and hardly adheres to the surface of the optical element 11.

If the dust 30 adheres to the surface of the optical element 11 or the single minute-particle layer 11a, the Van der Waals force acts as an interaction force between the dust 30 and the surface of the optical element 11. The Van der Waals force is the adhesive force $F_V$:

$$F_V = HD/(12Z^2) (N) \quad (2)$$

where H is the Hamaker constant (J) of the dust 30, D is the diameter (m) of the dust 30, and Z is the separation distance between the dust 30 and the surface of the single minute-particle layer 11a (or optical element 11) which is 0.4 nm.

As for the Van der Waals force to the same dust 30, the diameter D of the dust 30 and the Hamaker constant H are kept unchanged, and the separation distance Z changes between the presence and absence of the single minute-particle layer 11a on the surface of the optical element 11.

Figure 6A:
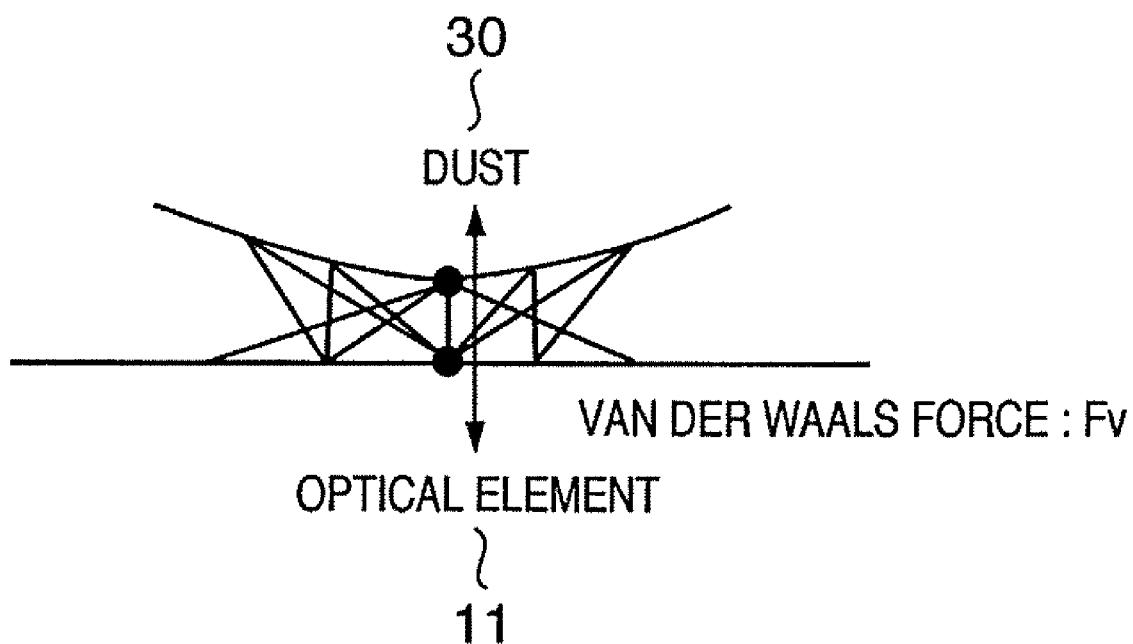
FIG. 6A is a view for explaining the Van der Waals force.

The Van der Waals force will be explained with reference to FIG. 6A.

The Van der Waals force is an interaction force acting between two objects, and can be obtained by adding (integrating) energies between all atoms in one object and all atoms in the other object. This is described in cited reference "J. N. Israelachivilli, "Intermolecular Force and Surface Force", Asakura Publishing, p. 172). The Van der Waals force acting between the dust 30 and the optical element 11 can also be calculated in the same way, as shown in FIG. 6A.

When the single minute-particle layer 11a is formed on the surface of the optical element 11, the sum of Van der Waals forces acting between the dust 30 and the minute particles 11b which form the single minute-particle layer 11a is the Van der Waals force acting between the dust 30 and the single minute-particle layer 11a.

The Van der Waals force may be generated between the dust 30 and the surface of the optical element 11 under the single minute-particle layer 11a, but the separation distance Z increases by the thickness of the single minute-particle layer 11a, i.e., the particle diameter (e.g., 200 nm) of the single minute particle 11b. From equation (2), when the single minute particle 11b has a particle diameter of 200 nm, Z in the presence of the single minute-particle layer 11a is 500 times longer than Z=0.4 nm in the absence of the single minute-particle layer 11a. The Van der Waals force is smaller by the square of Z, and the Van der Waals force acting between the dust 30 and the surface of the optical element 11 is negligible.

As described above, the contact area between the dust 30 and the single minute-particle layer 11a is smaller than that between the dust 30 and the surface of the optical element 11. The single minute-particle layer 11a can increase the separation distance from the dust 30 by the contact area difference. The Van der Waals force $F_V'$ acting between the single minute-particle layer 11a and the dust 30 in equation (2) can be given by $$F_V' = HD/(12Z_1^2) + HD/(12Z_2^2) \; (N) \quad (3)$$

where $Z_1$ is a separation distance corresponding to an area where the optical element 11 contacts the dust 30, and $Z_2$ is a separation distance corresponding to an area where the optical element 11 does not contact the dust 30 because the single minute-particle layer 11a is formed.

The second term (Van der Waals force acting in the area where the optical element 11 does not contact the dust 30) in equation (3) is smaller than the first term because the separation distance Z2 is larger than Z1. Letting Z be the separation distance between the dust 30 and the surface of the optical element 11 in the absence of the single minute-particle layer 11a, $$Z = Z_1$$

Even in this case, as described above, the contact area between the single minute-particle layer 11a and the dust 30 is smaller than that between the optical element 11 and the dust 30 in the absence of the single minute-particle layer 11a. Hence, the first term in equation (3) is smaller than the Van der Waals force acting on the optical element 11 in the absence of the single minute-particle layer 11a, which is calculated by equation (2). A comparison between the adheisve force $F_{V1}$ in the presence of the single minute-particle layer 11a and the adhesive force $F_{V2}$ in the absence of the single minute-particle layer 11a, which are given by equation (3), reveals $$F_{V1} < F_{V2}$$

From this, the single minute-particle layer 11a weakens the adhesive force of the dust 30 to the single minute-particle layer 11a (optical element 11). Even if the dust 30 is to adhere to the optical element 11, its adhesive force is weak in the presence of the single minute-particle layer 11a. The dust 30 drops from the surface of the optical element 11 under the influence of gravity applied to the dust 30, and hardly adheres to the surface of the optical element 11.

FIG. 6B is a table showing an example of the result of measuring the adhesive force of dust in the presence and absence of the single minute-particle layer 11a in the embodiment.

The adhesive force was measured using "Contactole PAF-300N" available from Okada Seiko as an apparatus for measuring the adhesive force between minute particles (see Japanese Patent Laid-Open No. 2001-183289 for details of the measurement method).

The embodiment used the polystyrene particle 50 μm in average diameter as the dust 30. Measurement was done using two types of single minute-particle layers 11a: a single minute-particle layer 11a of single minute particles 11b having a particle diameter of 90 nm and a single minute-particle layer 11a of single minute particles 11b having a particle diameter of 170 nm.

As shown in FIG. 6B, it was confirmed that the single minute-particle layer 11a reduced the adhesive force by about 20%.

The above structure can decrease the liquid bridge force in addition to the Van der Waals force by the single minute-particle layer 11a without any optical adverse effect, and can suppress adhesion of dust to the surface of the optical element.

Figure 7:
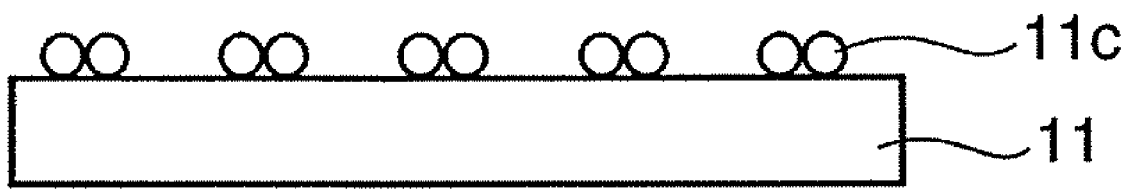
FIG. 7 is a view showing a modification of the single minute-particle layer in the embodiment of the present invention.
Figure 8:
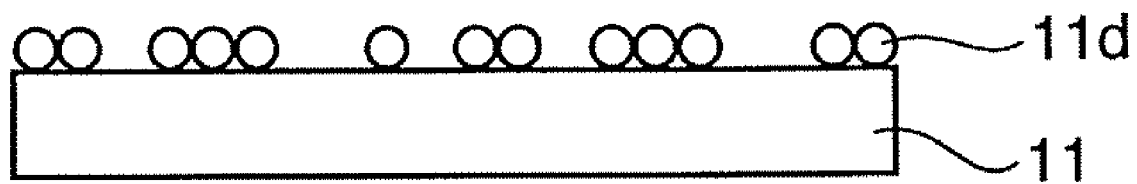
FIG. 8 is a view showing another modification of the single minute-particle layer in the embodiment of the present invention.

The embodiment finely arrays the single minute-particle layer 11a on the surface of the optical element 11, but the present invention is not limited to this. For example, as shown in FIG. 7, single minute-particle layers 11c may be arrayed at predetermined pitches by printing or the like. Alternatively, as shown in FIG. 8, minute particles of $SiO_2$ or the like may be deposited on a substrate at random by laser ablation to form single minute-particle layers 11d. Even in this case, the contact areas between the dust 30 and the single minute-particle layers 11c and 11d become smaller than that between the dust 30 and the surface of the optical element 11. The Van der Waals force decreases to obtain the same effects as those described in the embodiment.

By applying water-repellent coating to the surface of the single minute particle 11b, the single minute particle 11b becomes water-repellent and the single minute-particle layer 11a also becomes water-repellent. This can increase the contact angle with the dust 30 from that described in the embodiment, and can decrease the bridge force. As a result, adhesion of dust to the surface of the optical element can be further suppressed.

In addition, for example, when the single minute particle 11b of the single minute-particle layer 11a is formed from a conductive material or conductive coating is applied to the surface of the single minute particle 11b, the single minute particle 11b becomes conductive and the single minute-particle layer 11a also becomes conductive. That is, the single minute-particle layer 11a can be functionalized by adding various functions to the single minute particle 11b which forms the single minute-particle layer 11a. As a result, functions such as conduction can be added, and adhesion of dust to the surface of the optical element can be suppressed.

The embodiment forms the single minute-particle layer 11a directly on the surface of the optical element 11, but the present invention is not limited to this.

Figure 9:
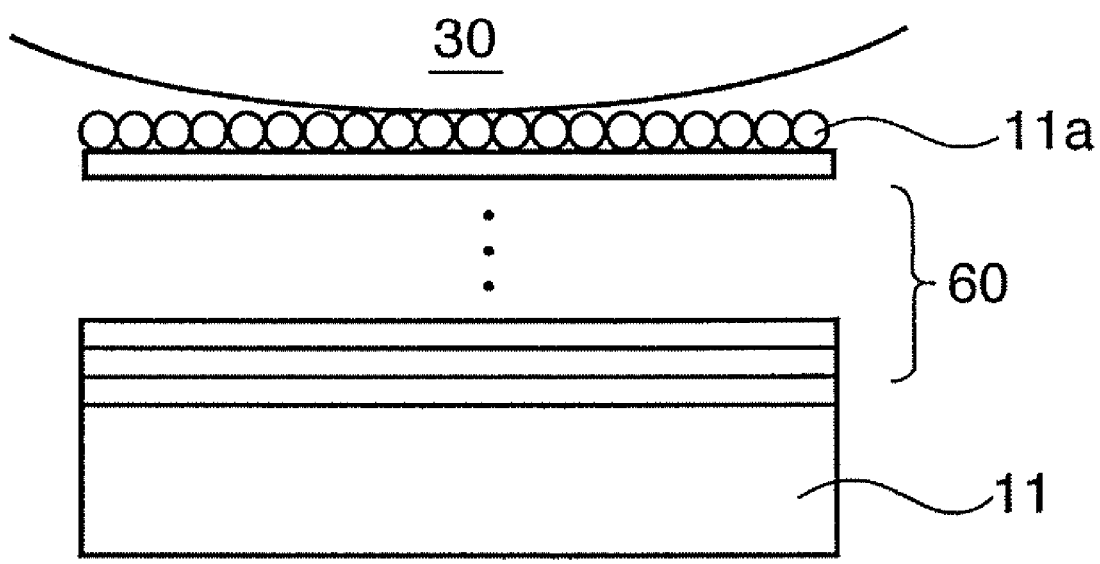
FIG. 9 is a view showing a modification of a single minute-particle layer 11a in the embodiment of the present invention.

For example, the surface of the optical element 11 is often covered with a dielectric multilayered film in order to cut infrared rays while decreasing the surface reflectance. In this case, the single minute-particle layer 11a is formed on the top surface of a dielectric multilayered film 60, as shown in FIG. 9. The dielectric multilayered film 60 under the single minute-particle layer 11a can maintain desired optical performance (e.g., spectral transmittance). In addition, the single minute-particle layer 11a can suppress the adhesive force of dust to the surface of the optical element 11. The dielectric multilayered film 60 must be designed in consideration of the optical characteristics (e.g., refractive index) of the single minute-particle layer 11a.

If the dielectric multilayered film 60 is formed on the single minute-particle layer 11a in order to obtain desired optical performance, the dielectric multilayered film 60 fills and flattens the minute shape of the single minute-particle layer 11a on the surface of the optical element 11. To suppress adhesion of the dust 30, the single minute-particle layer 11a must be formed on the top surface of the dielectric multilayered film 60, as described above.

Figure 10:
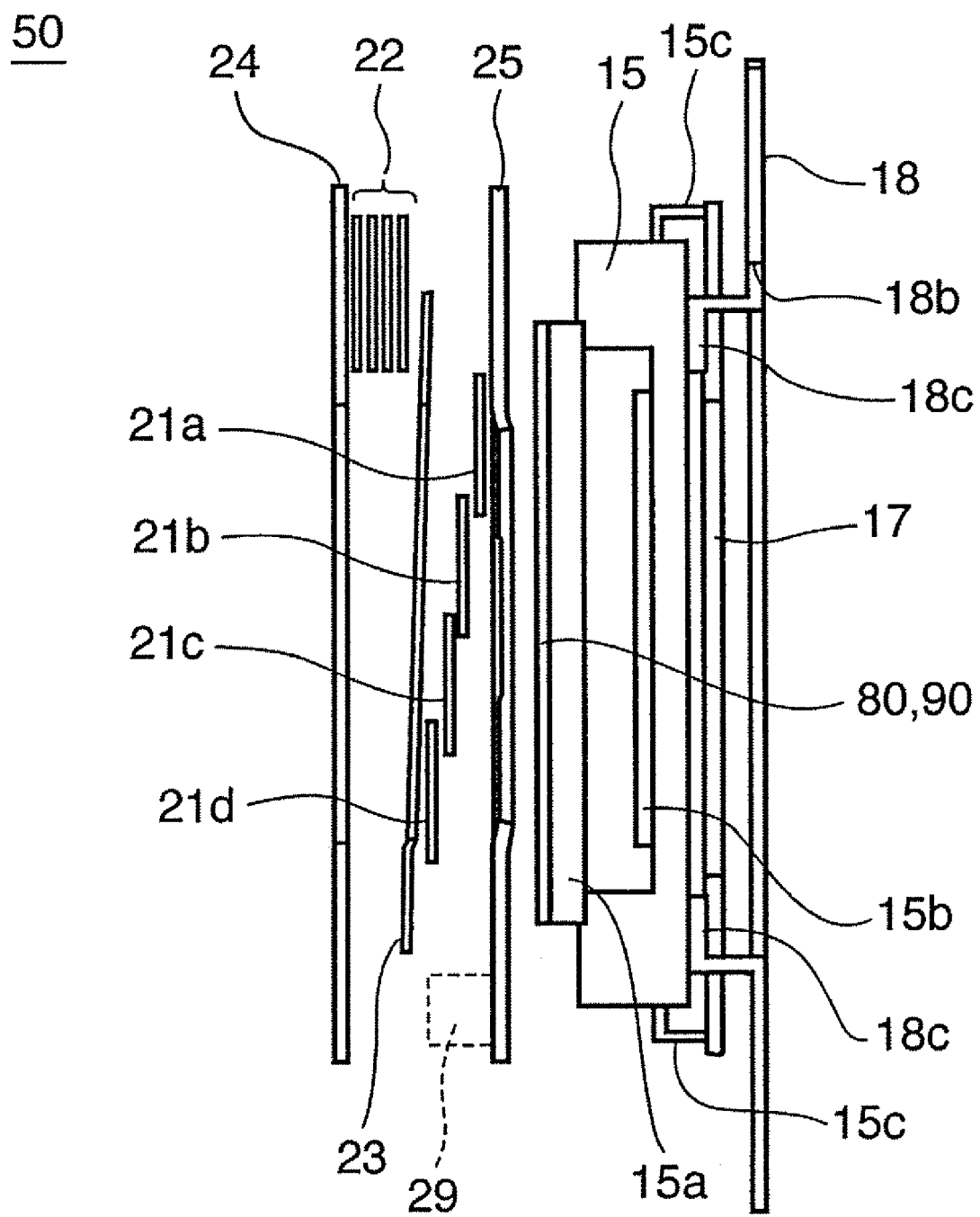
FIG. 10 is a side sectional view for explaining the schematic structures of the image capturing unit and focal plane shutter of the D-SLR in a modification to the embodiment of the present invention.

The embodiment forms the single minute-particle layer 11a on the surface of the optical element 11. If the optical element 11 is not interposed between the focal plane shutter 50 and the solid-state image sensing device 15, i.e., if the focal plane shutter 50 faces the solid-state image sensing device 15 (see FIG. 10), dust adhered to the surface of the solid-state image sensing device 15 causes a problem.

In this case, a single minute-particle layer 80 is formed on the surface of the cover member 15a of the solid-state image sensing device 15 to obtain the same effects as those described in the embodiment. The single minute-particle layer 80 can suppress adhesion of dust to the surface of the solid-state image sensing device 15.

When a multilayered film such as an antireflection film is formed on the surface of the cover member 15a of the solid-state image sensing device 15, the single minute-particle layer 80 is formed on the top surface of the multilayered film, as described above. The single minute-particle layer 80 can decrease the adhesive force of the dust 30 while obtaining desired optical performance, and can suppress adhesion of dust to the surface of the solid-state image sensing device 15.

As has been described above, the embodiment can suppress adhesion of dust to the surface of an optical filter and the cover glass surface of a solid-state image sensor without any optically adverse effect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-326592, filed Nov. 10, 2005 which is hereby incorporated by reference herein in its entirety.

What is claimed is:

1. An image capturing apparatus comprising:
    an image capturing unit which converts an optical image of an object into an electrical signal; and
        an optical element arranged in front of said image capturing unit,
        wherein minute particles of a single layer are arrayed on a surface of said optical element on an object side, and diameters of the minute particles are not more than 200 nm,
        wherein a relationship between a contact angle $\theta 1$ with water of a surface of said optical element on which the minute particles of the single layer are not arrayed and a contact angle $\theta 2$ with water of a surface of said optical element on which the minute particles of the single layer are arrayed satisfies a relationship $\theta 1 < \theta 2$, and
        wherein a relationship between a Van der waals force Fv1 acting between a foreign substance and the surface of said optical element on which the minute particles of the single layer are arrayed and a Van der waals force Fv2 acting between a foreign substance and the surface of said optical element on which the minute particles of the single layer are not arrayed satisfies a relation ship $Fv1 < Fv2$.

2. The apparatus according to claim 1, wherein a film of at least one layer is formed on the surface of said optical element on the object side, and minute particles of the single layer are arrayed on a surface of the film.

3. An image capturing apparatus comprising an image capturing unit which converts an optical image of an object into an electrical signal,
    wherein minute particles of a single layer are arrayed on a surface of said image capturing unit on an object side, and diameters of the minute particles are not more than 200 nm,
    wherein a relationship between a contact angle $\theta 1$ with water of a surface of said image capturing unit on which the minute particles of the single layer are not arrayed and a contact angle $\theta 2$ with water of a surface of said image capturing unit on which the minute particles of the single layer are arrayed satisfies a relationship $\theta 1 < \theta 2$, and
    wherein a relationship between a Van der waals force Fv1 acting between a foreign substance and the surface of said image capturing unit on which the minute particles of the single layer are arrayed and a Van der waals force Fv2 acting between a foreign substance and the surface of said image capturing unit on which the minute particles of the single layer are not arrayed satisfies a relation ship $Fv1 < Fv2$.

4. The apparatus according to claim 3, wherein a film of at least one layer is formed on the surface of said image capturing unit on the object side, and minute particles of the single layer are arrayed on a surface of the film.

* * * * *